(12) United States Patent
Shen et al.

(10) Patent No.: US 11,150,500 B2
(45) Date of Patent: Oct. 19, 2021

(54) DISPLAY DEVICE HAVING FUNCTIONAL COMPONENT AND SUPPORT FRAME

(71) Applicant: BOE TECHNOLOGY GROUP CO., LTD., Beijing (CN)

(72) Inventors: Zhiguo Shen, Beijing (CN); Ming Xiao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/968,654

(22) PCT Filed: Dec. 6, 2019

(86) PCT No.: PCT/CN2019/123655
§ 371 (c)(1),
(2) Date: Aug. 10, 2020

(87) PCT Pub. No.: WO2020/140691
PCT Pub. Date: Jul. 9, 2020

(65) Prior Publication Data
US 2020/0409207 A1 Dec. 31, 2020

(30) Foreign Application Priority Data
Jan. 4, 2019 (CN) .......................... 201920012874.7

(51) Int. Cl.
*G02F 1/1333* (2006.01)
*F21V 8/00* (2006.01)
(52) U.S. Cl.
CPC ....... *G02F 1/133308* (2013.01); *G02B 6/005* (2013.01); *G02B 6/0085* (2013.01);
(Continued)

(58) Field of Classification Search
CPC ..... G02F 1/133308; G02F 2001/13332; G02F 2001/133322; G02F 2001/133314
See application file for complete search history.

(56) References Cited

U.S. PATENT DOCUMENTS 8,550,689 B2 * 10/2013 Han ..................... G02B 6/0088
362/634
9,025,104 B2 * 5/2015 Hsiao ................ G02F 1/133308
349/58

(Continued)

FOREIGN PATENT DOCUMENTS

CN    104412314 A    3/2015
CN    104730766 A    6/2015
(Continued)

*Primary Examiner* — Keith G. Delahoussaye
(74) *Attorney, Agent, or Firm* — Scully, Scott, Murphy & Presser, P.C.

(57) ABSTRACT

A display device is provided. The display device includes: a housing, a display panel, a backlight module, and a functional component. The housing includes a receiving chamber having an opening and a front housing located at a side of the receiving chamber where the opening is located, the front housing includes a support frame extending into the receiving chamber; the display panel is located inside the receiving chamber; the backlight module is located at a side of the display panel away from the opening; the functional portion is located at a side of the display panel away from the backlight module. The support frame is configured to fix the functional component and to fix the backlight module, and at least one of the functional component or the support frame is bonded with the display panel to fix the display panel.

18 Claims, 3 Drawing Sheets (52) U.S. Cl.
CPC ........ *G02B 6/0088* (2013.01); *G02F 1/13332* (2021.01); *G02F 1/133314* (2021.01); *G02F 1/133322* (2021.01)

(56) References Cited

U.S. PATENT DOCUMENTS

| | | | | |
|---|---|---|---|---|
| 9,488,770 | B2* | 11/2016 | Horiguchi | G02B 6/0055 |
| 9,844,155 | B2* | 12/2017 | Ahn | H05K 5/02 |
| 10,324,329 | B2* | 6/2019 | Yang | G02F 1/133524 |
| 10,359,669 | B2* | 7/2019 | Iwaki | G02F 1/13394 |
| 10,371,887 | B2* | 8/2019 | Sugimoto | G02B 6/0088 |
| 10,795,195 | B2* | 10/2020 | Kudo | G02F 1/133305 |
| 2007/0290965 | A1* | 12/2007 | Shiraishi | G02F 1/13452 345/87 |
| 2011/0096569 | A1* | 4/2011 | Hamada | G02B 6/0085 362/613 |
| 2012/0206940 | A1* | 8/2012 | Han | G02B 6/009 362/609 |
| 2014/0002768 | A1* | 1/2014 | Kuo | G02F 1/133615 349/60 |
| 2014/0028948 | A1* | 1/2014 | Hsiao | G02F 1/133308 349/58 |
| 2014/0204275 | A1* | 7/2014 | Shimizu | G02B 6/0088 348/725 |
| 2014/0218656 | A1* | 8/2014 | Maruno | G02B 6/0088 349/60 |
| 2015/0146112 | A1 | 5/2015 | Gotou | |
| 2015/0177451 | A1 | 6/2015 | Kang et al. | |
| 2015/0219955 | A1 | 8/2015 | Son | |
| 2015/0234226 | A1* | 8/2015 | Ikuta | G02F 1/1336 348/794 |
| 2015/0253612 | A1* | 9/2015 | Hasegawa | G02F 1/133308 349/58 |
| 2015/0331178 | A1* | 11/2015 | Choi | G02F 1/133608 362/611 |
| 2016/0085109 | A1* | 3/2016 | Baek | G02F 1/133308 362/607 |
| 2016/0223739 | A1* | 8/2016 | Yoon | G02B 6/0085 |
| 2017/0205570 | A1* | 7/2017 | Sugimoto | G02F 1/133308 |
| 2017/0205654 | A1* | 7/2017 | Iwaki | G02F 1/133308 |
| 2017/0261803 | A1* | 9/2017 | Teramoto | G02F 1/133345 |
| 2017/0293167 | A1* | 10/2017 | Shen | G02F 1/1333 |

FOREIGN PATENT DOCUMENTS

| | | |
|---|---|---|
| CN | 204807865 U | 11/2015 |
| CN | 205301760 U | 6/2016 |
| CN | 207833171 U | 9/2018 |
| CN | 209356789 U | 9/2019 |

\* cited by examiner

DISPLAY DEVICE HAVING FUNCTIONAL COMPONENT AND SUPPORT FRAME

CROSS-REFERENCE TO RELATED APPLICATIONS

This application is a national stage entry of PCT International Application No. PCT/CN2019/123655, filed on Dec. 6, 2019, which claims priority to Chinese Patent Application No. 201920012874.7, filed on Jan. 4, 2019. The entire disclosure of each of PCT International Application No. PCT/CN2019/123655 and Chinese Patent Application No. 201920012874.7 is incorporated herein by reference.

TECHNICAL FIELD

At least one embodiment of the present disclosure relates to a display device.

BACKGROUND

The implementation of the technology of a conventional display terminal (for example, display device, monitor, or TV) includes two kinds of solutions, namely, modular device and integrated device. The modular device refers to assembling module portions independent from each other into a whole device. The module portions independent from each other include four structural portions: a back plate, a middle frame, a front frame, and a heat dissipation plate for light-emitting diodes. The whole device of the modular device also has a front frame, a rear housing and the like. In order to reduce the cost, the integrated device combines the front frame of the module portions with the front frame of the whole device, and the middle frame of the module portion is served as a support.

SUMMARY

At least one embodiment of the present disclosure provides a display device.

At least one embodiment of the present disclosure relates to a display device, including: a housing, including a receiving chamber having an opening and a front housing located at a side of the receiving chamber where the opening is located, the front housing including a support frame extending towards an interior of the receiving chamber; a display panel, located inside the receiving chamber; a backlight module, located at a side of the display panel away from the opening; and a functional component, located at a side of the display panel away from the backlight module. The support frame is configured to fix the functional component and to fix the backlight module; and at least one selected from the group consisting of the functional component and the support frame is bonded with the display panel to fix the display panel.

In some examples, at least a part of the functional component is located inside the receiving chamber; and the functional component includes one or a combination of one or more selected from the group consisting of a touch screen, a protective glass, a shielding glass provided with a shielding element, and a heating glass provided with a heating element.

In some examples, the support frame includes a support portion located at a side of the functional component facing the display panel, and the support portion is configured to support the functional component.

In some examples, a surface of the functional component, except a surface of a portion of the functional component supported by the support portion, is fully attached and bonded with the display panel to fix the display panel.

In some examples, the backlight module includes a light source located at a side of the display panel away from the functional component, and an inner side of the support frame is in thermally conductive connection with the light source so that the housing is served as a heat dissipation structure of the light source.

In some examples, a material of the housing includes copper or aluminum.

In some examples, the display panel includes a display region and a peripheral region surrounding the display region; the support frame further includes a light-shielding portion located between the display panel and the backlight module; and an orthographic projection of the light-shielding portion on the functional component is overlapped with an orthographic projection of the peripheral region of the display panel on the functional component.

In some examples, the light-shielding portion extends to the inner side of the support frame relative to the light source.

In some examples, the display panel is bonded onto the light-shielding portion of the support frame to fix the display panel.

In some examples, the backlight module further includes a light guide plate, and a back plate located at a side of the light guide plate away from the display panel; the back plate is configured to support the light guide plate, and the back plate is in thermally conductive connection with the support frame so that the support frame fixes the backlight module.

In some examples, the light source is located at a light incident side of a side surface of the light guide plate; and an orthographic projection of the light source on the functional component is located within an orthographic projection of the light-shielding portion on the functional component.

In some examples, an orthographic projection of the light guide plate on the functional component is overlapped with an orthographic projection of the light-shielding portion on the functional component.

In some examples, the light-shielding portion and the support portion are integrally formed.

In some examples, the light source is in thermally conductive connection with the inner side of the support frame through a thermally conductive adhesive.

In some examples, the front housing further includes a front-housing side wall and a front frame connected with the front-housing side wall; the front-housing side wall is located outside the front frame; the front frame is connected with the support frame; the support frame is located at an inner side of the front frame; and the front-housing side wall, the front frame, and the support frame are integrally formed.

In some examples, the housing further includes a rear housing, and the rear housing is connected with the front-housing side wall.

BRIEF DESCRIPTION OF THE DRAWINGS

In order to more clearly illustrate the technical solution of the embodiments of the present disclosure, the drawings of the embodiments will be briefly described in the following. It is obvious that the described drawings below are only related to some embodiments of the present disclosure without constituting any limitation thereto.

DETAILED DESCRIPTION

In order to make objectives, technical details and advantages of the embodiments of the present disclosure more clearly, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects.

Figure 1:
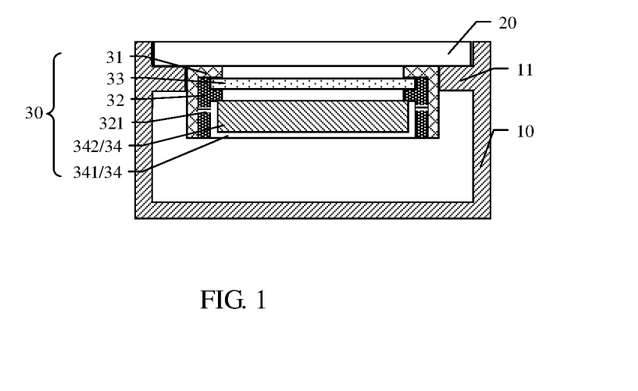
FIG. 1 is a schematic diagram of a partial structure of a modular device.

FIG. 1 is a schematic diagram of a partial structure of a modular device. As illustrated in FIG. 1, the display device includes a housing 10 of a whole device, and the housing 10 of the whole device includes a support frame 11 configured to support a touch screen 20. A module portion 30 is provided at a side of the touch screen 20 facing a chamber inside the housing 10 of the whole device. The module portion 30 includes a front frame 31, a middle frame 32, a display panel 33 supported by the middle frame 32, and a backlight module 34 located at a side of the display panel 33 away from the touch screen 20. A back plate 341 included in the backlight module 34 is connected with both the middle frame 32 and the front frame 31 to fix the backlight module 34. For example, the back plate 341 may be connected with the front frame 31 in a buckled manner through a hole 321 penetrating a wall of the middle frame 32, without limited thereto. A straight line in the hole 321 penetrating the wall in the figure schematically illustrates a connection relationship between the back plate 341 and the front frame 31. The backlight module 34 further includes other components 342 such as a light source, a light guide plate and an optical film; and the back plate 341 is used to support the other components 342 described above. In this display device, the position of the module portion 30 is fixed by bonding the front frame 31 of the module portion 30 with the touch screen 20; in this way, the touch screen 20 bears the weight of the entire module portion 30. In the case where the display device is designed as a large-sized display device, due to the heavy weight of the module portion 30, the weight carried by the touch screen 20 is large, which may cause a damage to the touch screen 20.

At least one embodiment of the present disclosure provides a display device. The display device includes a housing, a display panel, a backlight module, and a functional component. The housing includes a receiving chamber having an opening and a front housing located at a side the receiving chamber where the opening is located. The front housing includes a support frame extending towards an interior of the receiving chamber; the display panel is located inside the receiving chamber; the backlight module is located at a side of the display panel away from the opening; the function component is located at a side of the display panel away from the backlight module. The support frame is configured to fix the functional component and to fix the backlight module; and at least one selected from the group consisting of the functional component and the support frame is bonded with the display panel to fix the display panel. The housing design of the display device can omit a design of a front frame and a middle frame of a conventional module portion and simplify the structure; furthermore, at least one selected from the group consisting of the housing and the functional component located inside the housing is used to fix the display panel, which can reduce the weight carried by the functional component so as to prevent from a damage to the functional portion.

The display device provided by the embodiment of the present disclosure will be described below with reference to the drawings.

Figure 2A:
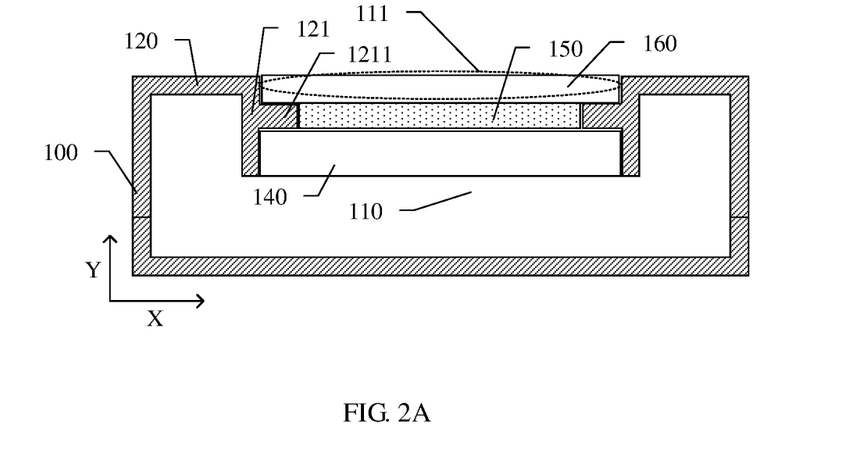
FIG. 2A is a cross-sectional view of a partial structure of a display device provided by an example of an embodiment of the present disclosure.

An example of an embodiment of the present disclosure provides a display device. FIG. 2A is a cross-sectional view of a partial structure of the display device provided by an embodiment of the present disclosure. As illustrated in FIG. 2A, the display device includes a housing 100, a display panel 150, a backlight module 140, and a functional component 160. The display device provided by the present disclosure may be a liquid crystal display device.

As illustrated in FIG. 2A, the housing 100 includes a receiving chamber 110 that is a space wrapped by the housing 100, and the receiving chamber 110 includes an opening 111. The housing 100 includes a front housing 120 located at a side of the receiving chamber 110 where the opening 111 is located, that is, the front housing 120 surrounds the opening 111. The front housing 120 includes a support frame 121 extending into the receiving chamber 110. The display panel 150 is located inside the receiving chamber 110, the backlight module 140 is located at a side of the display panel 150 away from the opening 111. That is, the display panel 150 is located at a light exiting side of the backlight module 140. It should be explained that, the receiving chamber 110 here includes a space surrounded by the support frame 121; the functional component 160, the display panel 150, and the backlight module 140 are all located in the receiving chamber 110; and a position where the functional component 160 is located is the opening 111 of the receiving chamber 110. Of course, the embodiments of the present disclosure are not limited to that the functional component is completely located in the receiving chamber, for example, a part of the functional component may be located outside the receiving chamber. The embodiment of the present disclosure is described with reference to the case where the opening 111 of the receiving chamber 110 is a part of the receiving chamber 110, by way of example.

As illustrated in FIG. 2A, the functional component 160 is located at the side of the display panel 150 away from the backlight module 140. For example, the functional component 160 includes one or a combination of one or more selected from the group consisting of a touch screen, a protective glass, a shielding glass provided with a shielding element, and a heating glass provided with a heating element.

For example, the functional component may include one of a touch screen, a protective glass, a shielding glass, and a heating glass; optionally, the functional component may include a touch screen and a protective glass located at a side of the touch screen away from the display panel; optionally, the functional component may include a protective glass, a shielding glass and a heating glass; optionally, the functional component may include a protective glass and a shielding glass located at a side of the protective glass facing the display panel; optionally, the functional component may include a protective glass and a heating glass located at a side of the protective glass facing the display panel, etc.

For example, the functional component may be a touch screen. The touch screen is a simple and convenient input device, and may include a substrate and a touch structure formed on the substrate. A touch position is determined by sensing a change in capacitance of the touch structure.

Figure 2B:
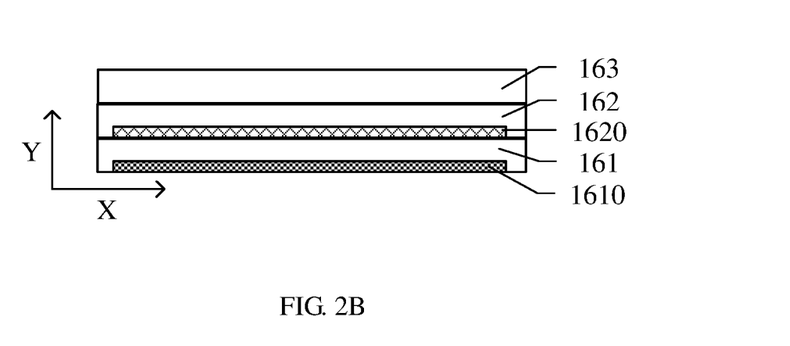
FIG. 2B is a schematic diagram of a structure of a functional component illustrated in FIG. 2A.

For example, FIG. 2B is a schematic diagram of a structure of a functional component illustrated in FIG. 2A. As illustrated in FIG. 2B, the functional component 160 may include three layers of glass, that is, a protective glass 163, a shielding glass 162 provided with a shielding element 1620, and a heating glass 161 provided with a heating element 1610. The heating glass 161 is located at a side of the shielding glass 162 close to the display panel, and the protective glass 163 is located at a side of the shielding glass 162 away from the heating glass 161. In the case where the display device is applied to a public display device suitable for usage of multiple people (for example, the public display device is suitable for environments such as cars, boats, or shopping malls), a protective glass may be provided at the outermost side of the display panel away from the backlight module, and a surface of the protective glass is easy to clean. The liquid crystal screen of the liquid crystal display device is usually switched on under low temperature conditions. By heating the liquid crystal screen through the heating glass located on a surface of the liquid crystal screen, the switched-on reaction speed of the liquid crystal screen can be increased; and the shielding glass provided between the heating glass and the protective glass can play a role of an electronic shielding effect on the display panel. This embodiment is not limited to the case where the functional component includes the above-mentioned three layers of glass, and may also include any one or any two of the above-mentioned three layers of glass.

As illustrated in FIG. 2A, the support frame 121 is configured to fix the functional component 160 and to fix the backlight module 140, and the functional component 160 is bonded with the display panel 150 to fix the display panel 150. In the case where the display device is designed as a large-sized display device, the backlight module in this embodiment is fixed by the housing, and the functional component bonded with the housing of the display device is only attached with the display panel and only bears the weight of the display panel without carrying the weight of the backlight module, so that the weight carried by the functional component is reduced and the probability of a damage to the functional component can be lowered.

For example, as illustrated in FIG. 2A, the support frame 121 includes a support portion 1211, the support portion 1211 is located at a side of the functional component 160 facing the display panel 150 and is bonded with the functional component 160 to fix the functional component 160. The present embodiment is not limited thereto, and the functional component may also be fixed on the support portion in other ways.

For example, as illustrated in FIG. 2A, in a direction parallel with a main plane of the display panel 150, a size of the display panel 150 is smaller than that of the functional component 160, and a surface of the functional component 160 except a surface of a portion supported by the support portion 1211 is fully attached and bonded with the display panel 150 to fix the display panel 150. In the present embodiment, the display panel and the functional component are bonded together, so that when the position of the functional component is fixed, the position of the display panel is determined.

For example, as illustrated in FIG. 2A, an orthographic projection of the support portion 1211 on the functional component 160 is not overlapped with an orthographic projection of the display panel 150 on the functional component 160, that is, the support portion 1211 also fixes the display panel 150 only by fixing the functional component 160.

For example, as illustrated in FIG. 2A, in the direction parallel with the main plane of the display panel 150, a small gap may be provided between the functional component 160 and the housing 100 so that it is easier for the functional component 160 to be placed on the support portion 1211 to achieve position fixing.

For example, as illustrated in FIG. 2A, in a plane parallel with the main plane of the display panel 150, the support portion 1211 is located at an edge of a periphery of the functional component 160 to fix the periphery of the functional component 160, thereby fixing the functional component.

In this example, the position of the display panel is fixed by being fully attached and bonded with the functional component, thereby omitting a front frame and a middle frame of a module portion, and simplifying the structure.

Figure 3A:
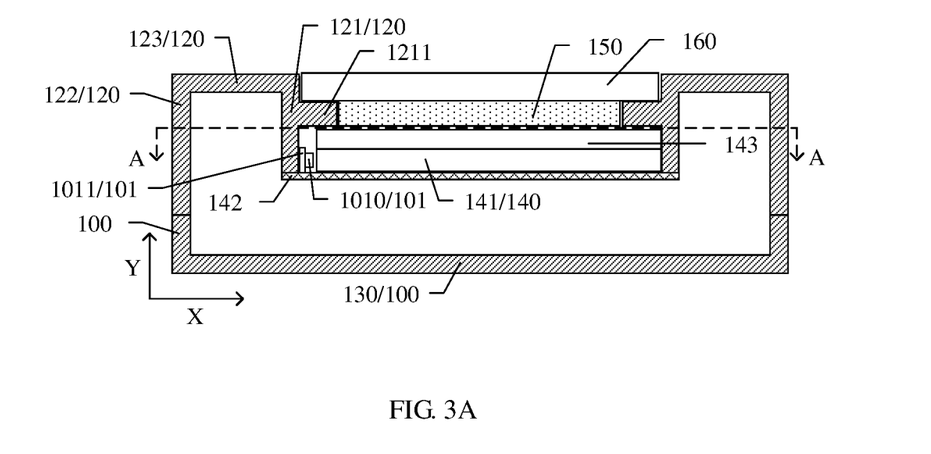
FIG. 3A is a cross-sectional view of a partial structure of a display device provided by an example of an embodiment of the present disclosure.

For example, FIG. 3A illustrates a partial structure of the backlight module in the example illustrated in FIG. 2A. As illustrated in FIG. 3A, the backlight module 140 includes a light source 101 located at the side of the display panel 150 away from the functional component 160, and an inner side of the support frame 121 is in thermally conductive connection with the light source 101 so that the housing 100 is served as a heat dissipation structure of the light source 101. The display device provided by the embodiment of the present disclosure does not need to separately provide a heat dissipation structure inside the housing for heat dissipation, but directly uses the housing as the heat dissipation structure for the light source, which can not only save the space inside the housing but also enable the heat generated by the light source in operation to be conducted to the housing and to be dissipated through the housing in time, thereby improving the heat dissipation efficiency of the display device and improving the reliability of the product's high-temperature operation. In addition, the arrangement of the embodiments of the present disclosure can also achieve sufficient heat dissipation for the display device with high brightness requirements. Thus, the housing of the display device provided by the embodiments of the present disclosure integrates the functions of a middle frame and a heat dissipation plate in a conventional modular device, further simplifying the structure.

The above-mentioned "thermally conductive connection" refers to that at least part of a surface of the light source is in direct contact with at least part of a surface of the housing (the contact surfaces may have a microcosmic gap therebetween) or is connected thereto by a thermally conductive material.

For example, the housing 100 used as the heat dissipation structure of the light source 101 is made of a thermally conductive material, and the thermally conductive material is a material with a high thermal conductivity.

For example, a material of the housing 100 may include copper, aluminum, or a combination of copper and aluminum or the like.

The material of the housing of the display device provided by this embodiment may be aluminum. In this case, a strength of the housing is high. As a result, the display device also meets the demand for the product with requirements on high strength of the housing.

Figure 3B:
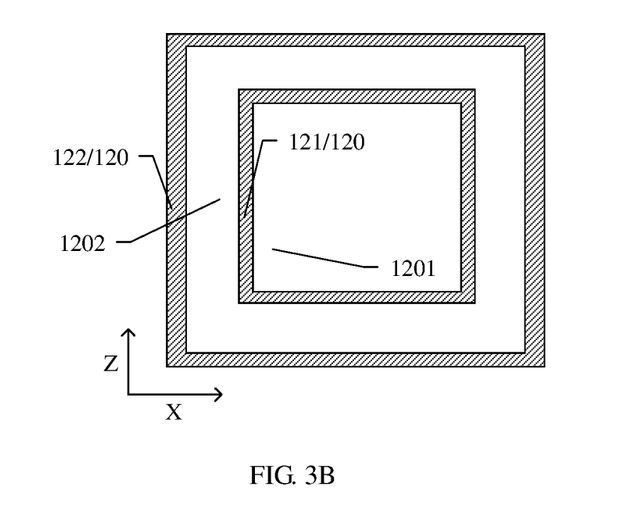
FIG. 3B is a plan view of a structure of a housing illustrated in FIG. 3A taken along line AA.

For example, FIG. 3B is a plan view of a structure of the housing of FIG. 3A taken along line AA. FIG. 3B schematically illustrates a planar structure of the display device illustrated in FIG. 3A taken along line AA. As illustrated in FIG. 3B, the support frame 121 surrounds the opening, the inner side of the support frame 121 refers to a region 1201 surrounded by the support frame 121 in an X-Z plane, and an outer side of the support frame 121 refers to a region 1202 outside the region surrounded by the support frame 121 in the X-Z plane.

For example, as illustrated in FIG. 3A, the support portion 1211 extends into an inner side of the support frame 121 relative to the light source 101, that is, an inner end of the support portion 1211 is closer to a center of the inner region surrounded by the support frame 121 relative to the light source 101. For example, an orthographic projection of the light source 101 on the functional component 160 is located within an orthographic projection of the support portion 1211 on the functional component 160.

For example, the light source 101 includes a light-emitting diode (LED) light bar 1010 and a printed circuit board (PCB) 1011, and the LED light bar 1010 is electrically connected with the printed circuit board 1011. For example, the printed circuit board 1011 includes a metal plate, and the LED light bar 1010 is disposed on the metal plate. The printed circuit board 1011 is bonded with the support frame 121 by a thermally conductive adhesive, and is bonded to the inner side of the support frame 121. As a result, the light source and the support frame are connected by a thermally conductive material to realize the thermally conductive connection of the light source and the support frame. Although the light source in this embodiment is located inside the housing, the light source and the support frame included in the housing are bonded by a thermally conductive adhesive, so as to realize the thermally conductive connection between the light source and the housing.

For example, the light source may be bonded with the support frame by a thermally conductive double-sided adhesive. The thermally conductive double-sided adhesive is made of acrylic polymer filled with thermally conductive ceramic powder and compounded with an organic silicone adhesive. The thermally conductive double-sided adhesive has characteristics of high thermal conductivity and insulation, and also has softness, compressibility, conformability and strong adhesion. The thermally conductive double-sided adhesive is suitable for a wide temperature range, and can closely and firmly attach the light source onto the support frame, thereby quickly conducting heat to the outside.

The housing, as a heat dissipation structure of the light source, can play the role of heat dissipation for the LED light bar and the printed circuit board, that is, the heat generated by the LED light bar is conducted to the housing through the printed circuit board so as to realize the heat dissipation.

For example, the light source 101 may include at least one LED light bar 1010, and the present embodiment is not limited thereto.

For example, the printed circuit board 1011 is electrically connected with the LED light bar 1010. The printed circuit board 1011 provides power to the LED light bar 1010 and controls the light intensity. The printed circuit board 1011 provides adjustable and uniform light with high intensity for the display device.

For example, as illustrated in FIG. 3A, the backlight module 140 further includes a light guide plate 141 and a light extraction structure 143. The light source 101 is located at an incident side of a side surface of the light guide plate 141, and a light exiting side of the light guide plate 141 faces the display panel 150. The light emitted from the light source 101 enters the light guide plate 141 and is totally reflected and propagated in the light guide plate 141, and then uniformly extracted out by the light extraction structure 143 located on the light exiting surface of the light guide plate 141.

For example, the light extraction structure 143 may include an optical dot film provided on a surface of the light guide plate 141. This embodiment is not limited to the case where the optical dot film is located at a side of the light guide plate facing the display panel, the optical dot film may also be located at a side of the light guide plate away from the display panel. For example, a material of the optical dot film may be the same as that of the light guide plate 141, and the optical dot film is distributed with optical dots having convex and concave structures.

For example, the optical dot film can also be replaced with a specific one-dimensional grating structure or two-dimensional grating structure, etc., and the present embodiment is not limited thereto. The light extraction structure is mainly designed according to the specific light source and the light-emitting condition of the light guide plate, so as to achieve uniform, intensity distribution of the light of the backlight light.

For example, the light extraction structure 143 further includes a diffusion film disposed at a side of the optical dot film away from the light guide plate 141, and the light passing through the diffusion film is scattered by scattering particles therein, so that the observer perceives the light as a brightness distribution directly provided by a surface of the diffusion film.

For example, the light extraction structure 143 may further include a prism film disposed at a side of the diffusion film away from the light guide plate 141, the prism film is configured to concentrate the light at a large angle into light at a small angle, thereby increasing a viewing brightness at a positive viewing angle.

For example, a predetermined distance may be provided between the light extraction structure 143 and the display panel 150 to prevent the light extraction structure 143 from scratching a surface of the display panel 150 facing the light guide plate 141.

For example, as illustrated in FIG. 3A, the backlight module 140 further includes a back plate 142 located at a side of the light guide plate 141 away from the display panel 150. The back plate 142 is configured to support components such as the light guide plate 141 and the light extraction structure 143, and the back plate 142 is in thermally conductive connection with the support frame 121 so that the support frame 121 can fix the backlight module 140.

For example, the light guide plate 141 may be bonded with the back plate 142 through a double-sided adhesive provided at a side (e.g., a peripheral edge) of the light guide plate 141 facing the back plate 142.

For example, a reflective sheet (not illustrated in the figure) may also be provided between the light guide plate 141 and the back plate 142, and the arrangement of the reflective sheet is beneficial to reflect the light emitted from the light source into the display panel, so as to increase the utilization rate of light.

For example, as illustrated in FIG. 3A, the back plate 142 is connected with the support frame 121 so that the light guide plate 141 is located on a light exiting side of the light source 101.

For example, the light source 101 in an example of this embodiment can also be in thermally conductive connection with the back plate 142. The back plate 142 is made of a thermally conductive material, so that both the housing and the back plate are served as heat dissipation structures of the light source, which can provide better heat dissipation for the LED light bar and the printed circuit board.

For example, the back plate 142 may be connected with the support frame 121 through a thermally conductive material. For example, the back plate 142 may also be bonded with the support frame 121 through a thermally conductive double-sided adhesive, and the present embodiment is not limited thereto. For example, the back plate and the support frame may also be connected in an elastically snap-fitted manner or through a screw.

For example, in the case where the back plate 142 is in thermally conductive connection with the support frame 121, the light guide plate 141 may also be bonded with the housing 100 to better fix the backlight module 140.

For example, as illustrated in FIG. 3A, the front housing 120 further includes a front-housing side wall 122 and a front frame 123 connected with the front-housing side wall 122. The front-housing side wall 122 is located outside the front frame 123; the front frame 123 and the support frame 121 are connected with each other; and the support frame 121 is located inside the front frame 123. The front-housing side wall 122 is located at a side of the front frame 123 away from the opening 111, and the support frame 121 is located at a side of the front frame 123 close to the opening 111.

For example, as illustrated in FIG. 3A, the front frame 123 is perpendicular to a Y direction, the front-housing side wall 122 is perpendicular to an X direction, and the X direction is perpendicular to the Y direction.

For example, the front frame 123 may be subjected to various surface treatments to form a critical surface of the display device without the need of additional decorative frames, so as to reduce the amount of the components and reduce the cost.

For example, as illustrated in FIG. 3A, the front-housing side wall 122, the front frame 123, and the support frame 121 are integrally formed. The front housing included in the housing is of an integrated structure. Therefore, the heat generated by the light source that is in thermally conductive connection with the support frame can be directly transmitted to the front frame and the front-housing side wall to be dissipated. A heat dissipation area of the front housing included in the housing in this embodiment is much larger than an area of a conventional heat dissipation structure for heat dissipation of the light source. Therefore, the housing provided by this embodiment can have a better heat dissipation effect and can improve the heat dissipation efficiency of the product.

For example, as illustrated in FIG. 3A, the housing 100 further includes a rear housing 130, which is connected with the front housing 120 to form the receiving chamber 110.

For example, as illustrated in FIG. 3A, a surface of the functional portion 160 away from the display panel 150 is flush with a surface of the front frame 123 away from the rear housing 130.

For example, as illustrated in FIG. 3A, the rear housing 130 includes a bottom plate perpendicular to the Y direction and a rear-housing side wall connected with the bottom plate, the rear housing 130 is connected with the front-housing side wall 122, that is, the rear-housing side wall and the front-housing side wall 122 are connected with each other to constitute a side wall of the housing 100.

For example, the rear housing 130 and the front housing 120 are fixedly connected by screws. In this case, a connection between the front housing and the rear housing is also a thermally conductive connection. After the light source transmits its heat to the front housing, a part of the heat will be conducted from the front housing to the rear housing, and be dissipated to the outside from the rear housing. The heat dissipation area of the front housing and the rear housing included in the housing in this embodiment is much larger than the area of a traditional heat dissipation structure for heat dissipation of the light source. Therefore, the housing provided by this embodiment can have a better heat dissipation effect and can improve the heat dissipation efficiency of the product.

Figure 4:
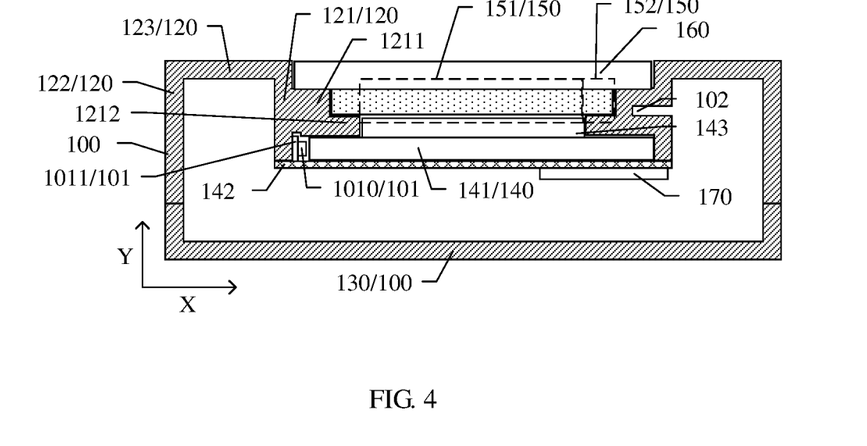
FIG. 4 is a schematic diagram of a partial structure of a display device provided by another example of an embodiment of the present disclosure.

For example, FIG. 4 is a schematic diagram of a partial structure of a display device provided by another example of an embodiment of the present disclosure. As illustrated in FIG. 4, the display panel 150 includes a display region 151 and a peripheral region 152 surrounding the display region 151. The support frame 121 further includes a light-shielding portion 1212 located between the light guide plate 141 and the display panel 150, and an orthographic projection of the light-shielding portion 1212 on the functional component 160 is overlapped with an orthographic projection of the peripheral region 152 of the display panel 150 on the functional component 160. An arrangement of the light-shielding portion can prevent from light leakage because the light emitted from the backlight module can only pass through the display panel and exit.

For example, as illustrated in FIG. 4, the light-shielding portion 1212 protrudes into an inner side of the support frame 121, with respect to the light source 101, for light shielding.

For example, as illustrated in FIG. 4, the light-shielding portion 1212 protrudes into an inner side of the support frame 121 relative to the support portion 1211, and an inner end of the light-shielding portion 1212 is closer to the center of the inner region surrounded by the support frame 121 than the inner end of the support portion 1211, that is, the light-shielding portion 1212 and the support portion 1211 constitute a stepped structure.

For example, as illustrated in FIG. 4, a size of a portion of the light-shielding portion 1212 inwardly extending into the inner side of the support frame 121 is larger than a size of a portion of the support portion 1211 inwardly extending into the inner side of the support frame 121.

For example, the light-shielding portion 1212 is located at a periphery of the display panel 150, that is, in a plane perpendicular to the Y direction, the light-shielding portion 1212 covers a periphery of the display panel 150 to prevent from light leakage. For example, an orthographic projection of the light-shielding portion 1212 on the functional component is not overlapped with an orthographic projection of the display region of the display panel 150 on the functional component.

For example, as illustrated in FIG. 4, the support frame 121 in this example may be of an integrated structure or a combined structure. For example, the light-shielding portion 1212 and the support portion 1211 may be formed as an integral, or may be formed as two parts connected with each other. The support frame formed as an integral can guarantee the structural strength.

For example, an orthographic projection of the light source 101 on the functional component is located within an orthographic projection of the light shielding portion 1212 on the functional component. For example, an orthographic projection of the light guide plate 141 on the functional component 160 is overlapped with an orthographic projection of the light-shielding portion 1212 on the functional component 160. Therefore, when the intensity of the light at the light incident side of the light source is uneven, the light-shielding portion can block the uneven light.

For example, in this example, the support frame 121 may be bonded with the display panel 150 to fix the display panel 150, that is, the display panel 150 is in contact with the light-shielding portion 1212, and in this case, the light-shielding portion 1212 may also play a role of fixing the display panel 150. In this example, the display panel may also be bonded with the functional component, so that the functional component and the light-shielding portion together play a role of fixing the display panel. The present example is not limited thereto, and the display panel may be bonded with the light-shielding portion of the support frame only, and may not be bonded with the functional component, so that only the support frame plays a role of fixing the display panel.

For example, as illustrated in FIG. 4, the display device further includes a driving board 170 located at a side of the backlight module 140 away from the display panel 150. For example, the driving board 170 may be electrically connected with the display panel 150 through a lead wire, so as to realize that the driving board 170 drives the display panel 150.

For example, as illustrated in FIG. 4, a via hole may be provided at a position where the support frame 121 is in contact with the display panel 150, and the lead wire may pass through the via hole to electrically connect the display panel 150 with the driving board 170.

For example, in the cross-section illustrated in FIG. 4, in the X direction, a groove 102 is provided at a side of the support frame located at both sides of the display panel 150, the groove 102 is opposite to the display panel 150 and may be provided with a via hole configured to allow a lead wire to pass therethrough, without limiting the embodiment thereto. In the X direction, the structure of the support frame located at both sides of the display panel 150 (that is, the cross-sectional shapes of the support frames located at both sides of the display panel 150) can also be the same, and the via hole can be provided in other positions, as long as the display panel 150 and the driving board 170 can be electrically connected with each other.

For example, the display device provided by this embodiment may be a liquid crystal display device, and the display device may also be any product or components with a display function including the liquid crystal display device such as a TV, a digital camera, a mobile phone, a watch, a tablet computer, a notebook computer, a navigator, etc., without limiting the present embodiment thereto.

Another embodiment of the present disclosure provides a structural frame including the housing of the display device illustrated in FIG. 4. This embodiment is only described with reference to the case where the structural frame includes the housing included in the display device illustrated in FIG. 4 by way of example, without limited thereto, and the structural frame may also include the housing included in the display device illustrated in FIG. 2A.

Figure 5:
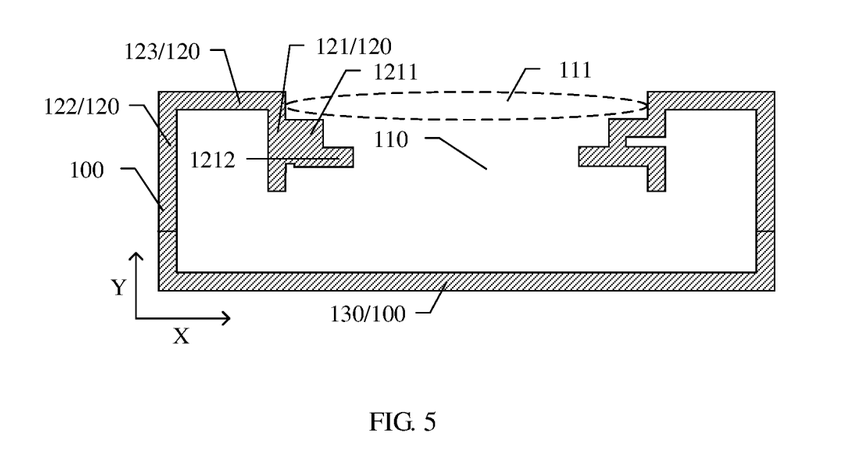
FIG. 5 is a cross-sectional structural diagram of a structural frame provided by an embodiment of the present disclosure.

FIG. 5 is a cross-sectional structural diagram of a structural frame provided by this embodiment. As illustrated in FIG. 5, the structural frame includes a housing 100. The housing 100 is made of a thermally conductive material, and the thermally conductive material is a material with a high thermal conductivity.

For example, a material of the housing 100 may include copper, aluminum, or a combination of copper and aluminum.

For example, as illustrated in FIG. 5, the housing 100 includes a receiving chamber 110 that is a space wrapped by the housing 100, and the receiving chamber 110 includes an opening 111.

For example, as illustrated in FIG. 5, the housing 100 includes a front housing 120 located at a side of the receiving chamber 110 where the opening 111 is located, and the front housing 120 surrounds the opening 111. The front housing 120 includes a support frame 121 extending towards an interior of the receiving chamber 110.

For example, as illustrated in FIG. 5, the front housing 120 further includes a front-housing side wall 122 and a front frame 123 connected with the front-housing side wall 122. The front-housing side wall 122 is located outside the front frame 123, and the front frame 123 is connected with the support frame 121; the support frame 121 is located at an inner side of the front frame 123. The front-housing side wall 122 is located at a side of the front frame 123 away from the opening 111, and the support frame 121 is located at a side of the front frame 123 close to the opening 111.

For example, as illustrated in FIG. 5, the front frame 123 is perpendicular to the Y direction, the front-housing side wall 122 is perpendicular to the X direction, and the X direction is perpendicular to the Y direction.

For example, as illustrated in FIG. 5, the front-housing side wall 122, the front frame 123, and the support frame 121 are integrally formed.

For example, as illustrated in FIG. 5, the housing 100 further includes a rear housing 130 that is connected with the front housing 120 to form a receiving chamber 110.

For example, as illustrated in FIG. 5, the rear housing 130 includes a bottom plate perpendicular to the Y direction and a rear-housing side wall connected with the bottom plate, the rear housing 130 is connected with the front-housing side wall 122, that is, the rear-housing side wall and the front-housing side wall 122 are connected with each other to constitute a side wall of the housing 100.

For example, the rear housing 130 and the front housing 120 are fixedly connected by screws.

For example, as illustrated in FIG. 5, the support frame 121 includes a support portion 1211 and a light-shielding portion 1212. The light-shielding portion 1212 is located at a side of the support portion 1211 facing the opening, and the light-shielding portion 1212 inwardly protrudes into an inner side of the support frame 121 relative to the support portion 1211. That is, an inner end of the light-shielding portion 1212 is closer to a center of an inner region surrounded by the support frame 121 relative to an inner end of the support portion 1211.

For example, as illustrated in FIG. 5, the support portion 1211 and the light-shielding portion 1212 constitute a stepped structure.

For example, as illustrated in FIG. 5, the support frame 121 may be of an integrated structure or a combined structure. For example, the support portion 1211 and the light-shielding portion 1212 may be made as an integral, or may be made into two parts connected with each other. The support frame made as an integral can guarantee the structural strength.

In the case where the structural frame provided by this embodiment is used as the housing of the display device, the light source located in the display device is in thermally conductive connection with the housing of the display device, so that the heat generated by the light source during operation can be conducted to the housing to be dissipated timely through the housing, so as to improve the heat dissipation efficiency of the display device and improve the reliability of the product's high-temperature work. In addition, the design method of the structural frame can omit designs of a front frame and a middle frame of a conventional module portion, thereby simplifying the structure.

It should be explained as follows.

(1) In the drawings of the embodiments of the present disclosure, only the structures related to the embodiments of the present disclosure are involved, and other structures may refer to the common design(s).

(2) In case of no conflict, features in one embodiment or in different embodiments of the present disclosure can be combined.

The above are merely particular embodiments of the present disclosure without construing any limitation to the protection scope of the present disclosure; and the protection scope of the present disclosure should be defined in the appended claims.

What is claimed is:

1. A display device, comprising:
a housing, comprising a receiving chamber having an opening and a front housing located at a side of the receiving chamber where the opening is located, the front housing comprising a support frame extending towards an interior of the receiving chamber;
a display panel, located inside the receiving chamber;
a backlight module, located at a side of the display panel away from the opening; and
a functional component, located at a side of the display panel away from the backlight module, wherein
the support frame is configured to fix the functional component and to fix the backlight module, and
at least one of the functional component or the support frame is bonded with the display panel to fix the display panel, wherein
the support frame comprises a support portion located at a side of the functional component facing the display panel, the support portion is configured to support the functional component, and an orthographic projection of the support portion on the functional component is not overlapped with an orthographic projection from a perimeter of the display panel on the functional component.

2. The display device according to claim 1, wherein at least a part of the functional component is located inside the receiving chamber, and the functional component comprises one or a combination of one or more selected from the group consisting of a touch screen, a protective glass, a shielding glass provided with a shielding element, and a heating glass provided with a heating element.

3. The display device according to claim 1, wherein a surface of the functional component, except a surface of a portion of the functional component supported by the support portion, is fully attached and bonded with the display panel to fix the display panel.

4. The display device according to claim 1, wherein the backlight module comprises:
a light source located at a side of the display panel away from the functional component, and an inner side of the support frame is in thermally conductive connection with the light source so that the housing is served as a heat dissipation structure of the light source.

5. The display device according to claim 4, wherein a material of the housing comprises copper or aluminum.

6. The display device according to claim 4, wherein the display panel comprises a display region and a peripheral region surrounding the display region,
the support frame further comprises a light-shielding portion located between the display panel and the backlight module, and
an orthographic projection of the light-shielding portion on the functional component is overlapped with an orthographic projection of the peripheral region of the display panel on the functional component.

7. The display device according to claim 6, wherein the light-shielding portion extends to the inner side of the support frame relative to the light source.

8. The display device according to claim 6, wherein the display panel is bonded onto the light-shielding portion of the support frame to fix the display panel.

9. The display device according to claim 6, wherein the backlight module further comprises a light guide plate, and a back plate located at a side of the light guide plate away from the display panel, and
the back plate is configured to support the light guide plate, and the back plate is in thermally conductive connection with the support frame so that the support frame fixes the backlight module.

10. The display device according to claim 9, wherein the light source is located at a light incident side of a side surface of the light guide plate, and
an orthographic projection of the light source on the functional component is located within the orthographic projection of the light-shielding portion on the functional component.

11. The display device according to claim 9, wherein an orthographic projection of the light guide plate on the functional component is overlapped with the orthographic projection of the light-shielding portion on the functional component.

12. The display device according to claim 6, wherein the light-shielding portion and the support portion are integrally formed.

13. The display device according to claim 4, wherein the light source is in thermally conductive connection with the inner side of the support frame through a thermally conductive adhesive.

14. The display device according to claim 1, wherein the front housing further comprises a front-housing side wall and a front frame connected with the front-housing side wall, the front-housing side wall is located outside the front frame, the front frame is connected with the support frame, the support frame is located at an inner side of the front frame, and the front-housing side wall, the front frame, and the support frame are integrally formed.

15. The display device according to claim 14, wherein the housing further comprises a rear housing, and the rear housing is connected with the front-housing side wall.

16. The display device according to claim 1, wherein in a plane parallel to a main plane of the display panel, the support portion is located at a peripheral edge of the functional component.

17. The display device according to claim 5, wherein the display panel comprises a display region and a peripheral region surrounding the display region, the support frame further comprises a light-shielding portion located between the display panel and the backlight module, and an orthographic projection of the light-shielding portion on the functional component is overlapped with an orthographic projection of the peripheral region of the display panel on the functional component.

18. The display device according to claim 17, wherein the light-shielding portion extends to the inner side of the support frame relative to the light source.

\* \* \* \* \*